Figure 1:
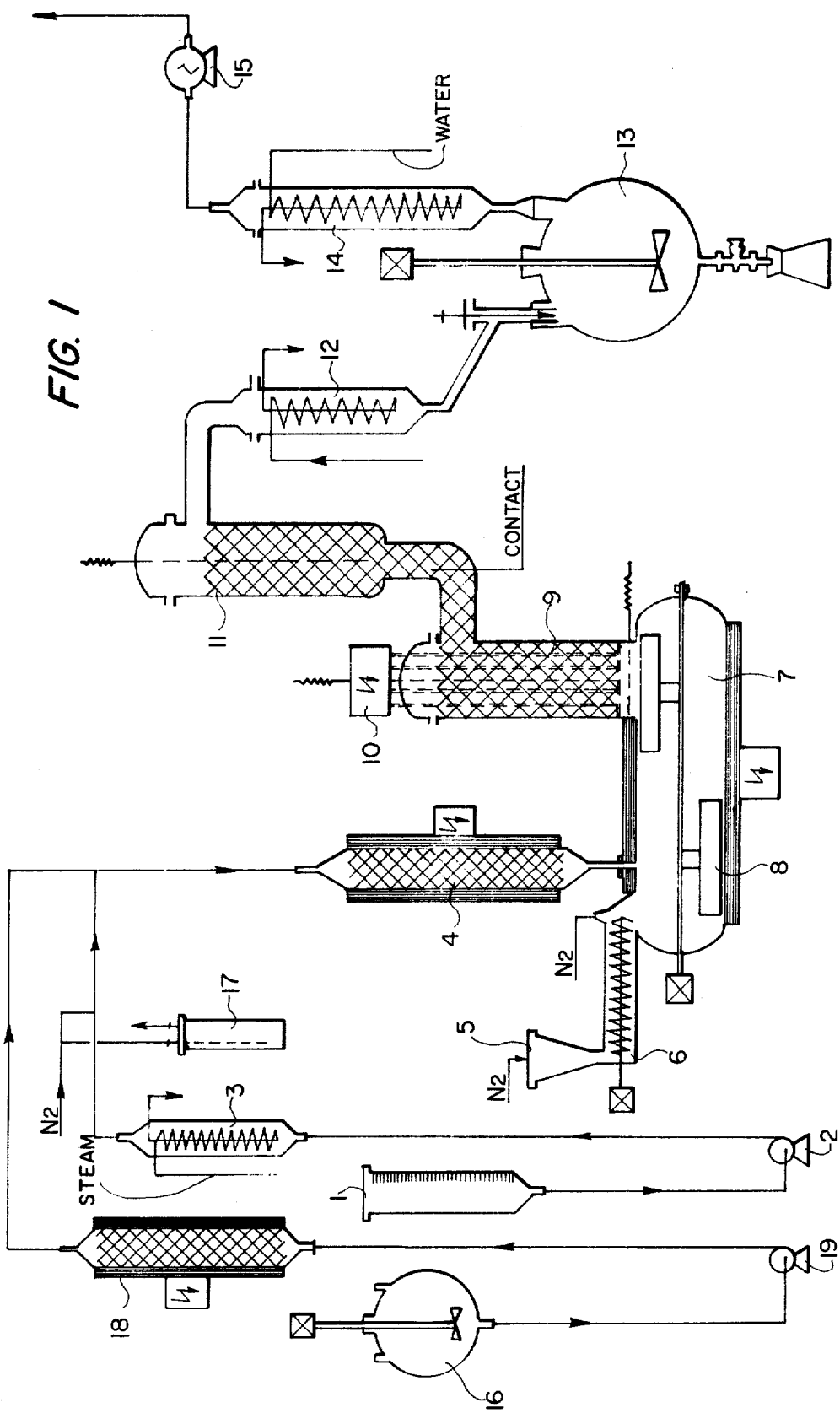

United States Patent [19]

List et al.

[11] 3,886,200

[45] May 27, 1975

[54] PROCESS FOR THE PREPARATION OF TEREPHTHALIC ACID DIMETHYLESTER

[75] Inventors: Ferdinand List; Helmut Alfs; Kurt Wember, all of Marl; Friedrich-August Orlowski, Haltern, all of Germany

[73] Assignee: Chemische Werke Huls Aktiengesellschaft, Marl, Kreis Recklinghausen, Germany

[22] Filed: May 25, 1973

[21] Appl. No.: 364,085

[30] Foreign Application Priority Data

June 6, 1972 Germany............................ 2227396

[52] U.S. Cl............................................ 260/475 R
[51] Int. Cl............................................. C07c 69/82
[58] Field of Search ................................ 260/475 R

[56] References Cited
UNITED STATES PATENTS 3,617,226  11/1971  List et al. ...................... 260/475 R
3,676,485  7/1972  Lewis et al. ..................... 260/475 B

FOREIGN PATENTS OR APPLICATIONS 1,212,063  4/1964  Germany ........................ 260/475
875,041  8/1961  United Kingdom................. 260/475

*Primary Examiner*—Lorraine A. Weinberger
*Assistant Examiner*—E. Jane Skelly
*Attorney, Agent, or Firm*—Pierce, Scheffler & Parker

[57] ABSTRACT

The invention involves an improvement in the continuous process of esterifying powdered terephthalic acid with methanol, at elevated temperature, with the aid of a catalyst in lump form. For minimizing the simultaneous production of unwanted by-products (such as terephthalaldehyde, terephthalic acid monomethyl ester, and p-toluic acid methyl ester) and to avoid other undesirable phenomena, applicants use as starting material the powdered terephthalic acid admixed with a substantial proportion (e.g., 50–100 % by weight, based on the weight of the terephthalic acid) of terephthalic acid dimethyl ester.

8 Claims, 2 Drawing Figures

PROCESS FOR THE PREPARATION OF TEREPHTHALIC ACID DIMETHYLESTER

The invention relates to the production of terephthalic dimethyl ester, and is concerned with the provision of an improved process for the preparation of terephthalic acid dimethyl ester by continuous esterification of terephthalic acid with methanol, at increased temperature, in the presence of pieces (e.g., lumps) of catalyst, according to which process finely powdered terephthalic acid is blown with methanol in the vapor state to form a fine dispersion, and whereby this dispersion is conducted directly through a mass of esterification catalyst in lump form.

There heretofore had been disclosed a process in which powdered terephthalic acid, its grain size ranging approximately from 5 to 50 $\mu$, was blown in a vortex furnace, preferably at a temperature between 300° and 350° C., with methanol in the vapor state to form a fine dispersion, whereupon the mixture was conducted immediately, at a temperature above 300° C., through a mass or body of lumps or other sizeable esterification catalyst bodies, for example beads of silica gel. The esterification was practically instantaneous, in other words, the dwell time of the reactants in the esterification reactor amounted to a few seconds only.

The flow of the product which emerged from the esterification reactor and which consisted of methanol, terephthalic acid dimethyl ester, terephthalic acid monomethyl ester and water, was cooled in stages, yielding a crude product consisting mostly of a suspension of finely crystallized terephthalic acid dimethyl ester in methanol, which crude reaction product also contained, in addition to other impurities, the more easily soluble intermediate products, including terephthalaldehyde acid methyl ester, terephthalic acid monomethyl ester, and p-toluic acid methyl ester. The terephthalic acid dimethyl ester was separated mechanically from this suspension, and was further processed by drying and purification by distillation.

Since esterification accomplished under these conditions was consummated within a period of a few seconds, thus subjecting the reaction products — including the by-products — to a low thermal stress only, there does not occur any divisional or secondary reactions, and since under this process there take place simultaneously a constant recrystallization, and thus a purification, the crude ester so obtained possesses an excellent quality (SZ = 1, Fp > 140° C.), so that the subsequent purification by distillation could be very simple.

A terephthalic acid material having a grain size between 1 and 150 $\mu$, and especially between 5 and 50 $\mu$, is appropriate for the proposed process, and preferably methanol vapor at a temperature between 320° and 330° C., with a molar ratio of terephthalic acid : methanol = 1:10:40. It is advantageous to use a vortex furnace in the form of a horizontal rotary furnace, equipped with a paddle system as well as inert bodies which can be specifically shaped silica gel material, serving as the catalyst.

Obviously, there exists in the aforesaid process the possibility that in case of inadequate dimensioning of the furnace or of an overloading of the vortex furnace, there form deposits, incrustations or lumps of terephthalic acid in the furnace, thus adversely affecting heat transfer at the heating surfaces. Also it is possible under those conditions that there form slight deposits of terephthalic acid on the inflow areas of the catalyst base, or on the lump-shaped esterification catalyst itself.

It is an object of the present invention to eliminate the aforesaid potential deficiency in a definite manner.

It already had been known (in view of U.S. Pat. No. 3,227,743) to prepare terephthalic acid dimethyl ester by inducing terephthalic acid to react with terephthalic acid dimethyl ester, thereby forming terephthalic acid monomethyl ester, and to esterify the latter simultaneously with methanol, thus obtaining terephthalic acid dimethyl ester. According to this patented process a suspension of terephthalic acid in methanol is continuously pumped into a reactor containing terephthalic acid dimethyl ester, thus producing terephthalic acid monomethyl ester, which latter, reacting with $CH_3OH$, is converted to terephthalic acid dimethyl ester. A sufficiently extensive dwell time is required to insure a satisfactory quantitative yield of dimethyl ester in this second phase of the reaction. The vapor mixture, comprising methanol, water, terephthalic acid dimethyl ester, terephthalic acid monomethyl ester and other by-products, is conducted through a bubble plate refluxer prior to its exit from the reactor, with the terephthalic acid dimethyl ester (employed as charge product) serving as the reflux material. The product flow, emerging through the head of the reactor, consists of terephthalic acid dimethyl ester, methanol and reaction water, together with small quantities of unreacted terephthalic acid and also terephthalic acid monomethyl ester, p-toluic acid, p-toluic acid methyl ester and traces of other impurities, and is further processed in successively arranged columns.

The above-described system requires a long dwell time for the terephthalic acid dimethyl ester as well as a high terephthalic-acid-dimethyl-ester level within the reactor, as clearly demonstrated by the examples given in the patent. There is required for the two-phase esterification of Example III initially 83 % of terephthalic acid dimethyl ester, 13 % of terephthalic acid and 4 % of terephthalic acid monomethyl ester, and subsequehtly 71% of terephthalic acid dimethyl ester, 4 % of terephthalic acid and 25 % of terephthalic acid monomethyl ester. In the case of the single-stage esterification of Example IV there are present 70.8 % of terephthalic acid dimethyl ester and 29.2 % of terephthalic acid.

Relatively long dwell times are also required for the conversion of terephthalic acid monomethyl ester to terephthalic acid dimethyl ester. Accordingly, the products are thus subjected to particularly heavy thermal stresses. The susceptible products go through dissociating reactions, and the intermediate and by-products (especially, the reactive carbonyl compounds) suffer secondary reactions, forming discolored condensation products which can be separated only with difficulties. For this reason it becomes necessary to ensure that even the initial acids are as pure as possible, which means especially that the content of terephthalic acid must be kept very low. Due to the feed-back of the crude ester, obtained by the synthesis, there occurs a continuous concentration within the reaction mixture of all intermediate products, involving again primarily the aldehyde components. This can be avoided only by feeding back a highly purified ester in place of the crude ester.

It is very obvious that this process cannot meet the technical requirements of a continuous esterification. Also, it was not to have been expected — in view of the involved method of operation — that the previously proposed process could be improved by incorporating therein a re-formation of terephthalic acid monomethyl ester.

The present invention solves the problem in question, in that to the originally employed mixture consisting of powdered terephthalic acid and methanol vapor there is added 50 to 100 molar percent, relative to the terephthalic acid, of terephthalic acid dimethyl ester.

For blowing the terephthalic acid with methanol in the vapor state there can advantageously be used a chamber with built-in fittings to prevent an agglomeration of the terephthalic acid (introduced in powder form) and its deposition on the catalyst or the filling material respectively; especially desirable to use an apparatus in the form of a horizontal rotary tube or rotatable furnace. This reactor is most appropriately heated from the outside, and is provided with a partial filling of inert bodies, taking up between 5 and 40 percent of the volume of the furnace. For this purpose, there may be used glass balls, ceramics such as spheres of porcelain or stoneware, and especially steel balls having diameters ranging from 2 to 10 mm, and especially 3 to 6 mm. In this latter connection the steel may be one that is used for ball races of roller bearings, but steels made from nickel-chromium alloys can also be employed.

When equimolecular quantities of terephthalic acid dimethyl ester in the vapor state and pulverized terephthalic acid, which is finely distributed and whirled within an overheated methanol vapor stream, are introduced into the abovedescribed chamber the conversion to terephthalic acid monomethyl ester runs its course rapidly. The reaction is then completed within seconds (SZ < 1) in movement into and through an immediately adjacent heated fixed bed of silica gel in lump form.

If the filling in the rotating (or, vortex) furnace is catalyst material in place of the aforesaid steel balls, an extensive esterification, depending on the activity of the catalyst being used, will already take place within the furnace so that in the fixed bed reactor, installed after the furnace, only still remaining portions of the starting materials, or of the intermediate products respectively, need to be converted. Suitable catalysts are the known esterification contact material, for example, substances which at increased temperatures will accelerate condensation reactions and which can be converted into granular, substantially abrasion-resistant, shapes: these include silicates, phosphates, oxides and borates of the elements of the I. to IV. main groups and auxiliary series of the periodic table and especially catalysts consisting of iron phosphate, zinc borate, aluminum phosphate, sodium silicate, silica gel, aluminum oxide, boron phosphate and lead oxide, especially metallic compounds of amphoteric character, but also activated charcoal treated with phosphoric acid. Preferably there are used silica gel beads (as described in German published patent application No. 1,667,430) which have been treated with the vapor of a lower alcohol.

Terephthalic acid dimethyl ester is added in amounts of 50 to 100 molar percent, relative to the terephthalic acid, preferably 50 to 80, and especially 60 to 70 molar percent. The terephthalic acid dimethyl ester so added can be recycled ("zuruechgefuert") or fed from any storage; in any event, a crude, non-distilled product can always be used at great advantage.

The reaction within the vortex furnace is accomplished at temperatures ranging from 200° to 400° C., especially from 250° to 350° C. and preferably from 260° to 320° C., whereby the required temperature is directly dependent upon the activity of the catalyst, in other words, less active catalysts or inert filling material require higher esterification temperatures, and vice versa. The required heat is introduced into the system for example by means of heating media in the liquid or vapor state through contact surface heating.

Methanol vapor is introduced most advantageously in parallel flow with the terephthalic acid, which is initially fed into the system in powder form, in such manner that it (the vapor) is forced to flow through the entire reaction area which is particularly filled with inert material or lumps of silica gel. It also is advantageous if one portion of the overheated methanol vapor is introduced in such manner that it will flow through the spaces left between the heaped catalysts, or inert bodies respectively. This specific arrangement still further improves the reaction conditions, in other words, the space-time yield can be increased substantially by guiding a portion of the methanol vapor flow to the bottom of the reactor, that is to the region where the bulk of the filling or catalyst material will always remain even in case of vigorous rotation.

The process has the advantage that a practically completely converted product will be obtained regardless of whether the vortex furnace contains inert material such as steel balls or a catalyst such as silica gel beads. In the latter case the molar ratio of terephthalic acid dimethyl ester to terephthalic acid can be significantly below 1:1, for example, 1:50 to 65.

The process of the invention also offers the particular economic advantage that relatively impure terephthalic acid (for example, a commercial product having an aldehyde content > 1 %) can be used. The by-products are accumulated in the methanolic mother-liquor and thus are removed from the process. This also means that a terephthalic acid dimethyl ester which has not been highly purified by distillation can be returned to the process without causing a concentration of the intermediate, or by-products in the esterification mixture.

The above-described process is also advantageous in comparison with the process disclosed in published German Pat. application No. 1,933,946 Due to the parallel flow of vaporized terephthalic acid dimethyl ester into the rotary or vortex furnace there is attained a very rapid conversion of powdery terephthalic acid intermediately by the formation of terephthalic acid monomethyl ester in the vapor state, which will subsequently or immediately convert to terephthalic acid dimethyl ester by reacting with $CH_3OH$. Thus, there is eliminated any danger of deposits, incrustations or lump formations within the rotary furnace which would interfere substantially with the heat transfer at the heating surfaces. The process eliminates opportunity for accumulation of deposits of terephthalic acid at the areas of inflow into the catalyst bed, and of deposits within the catalyst bed.

Figure 2:
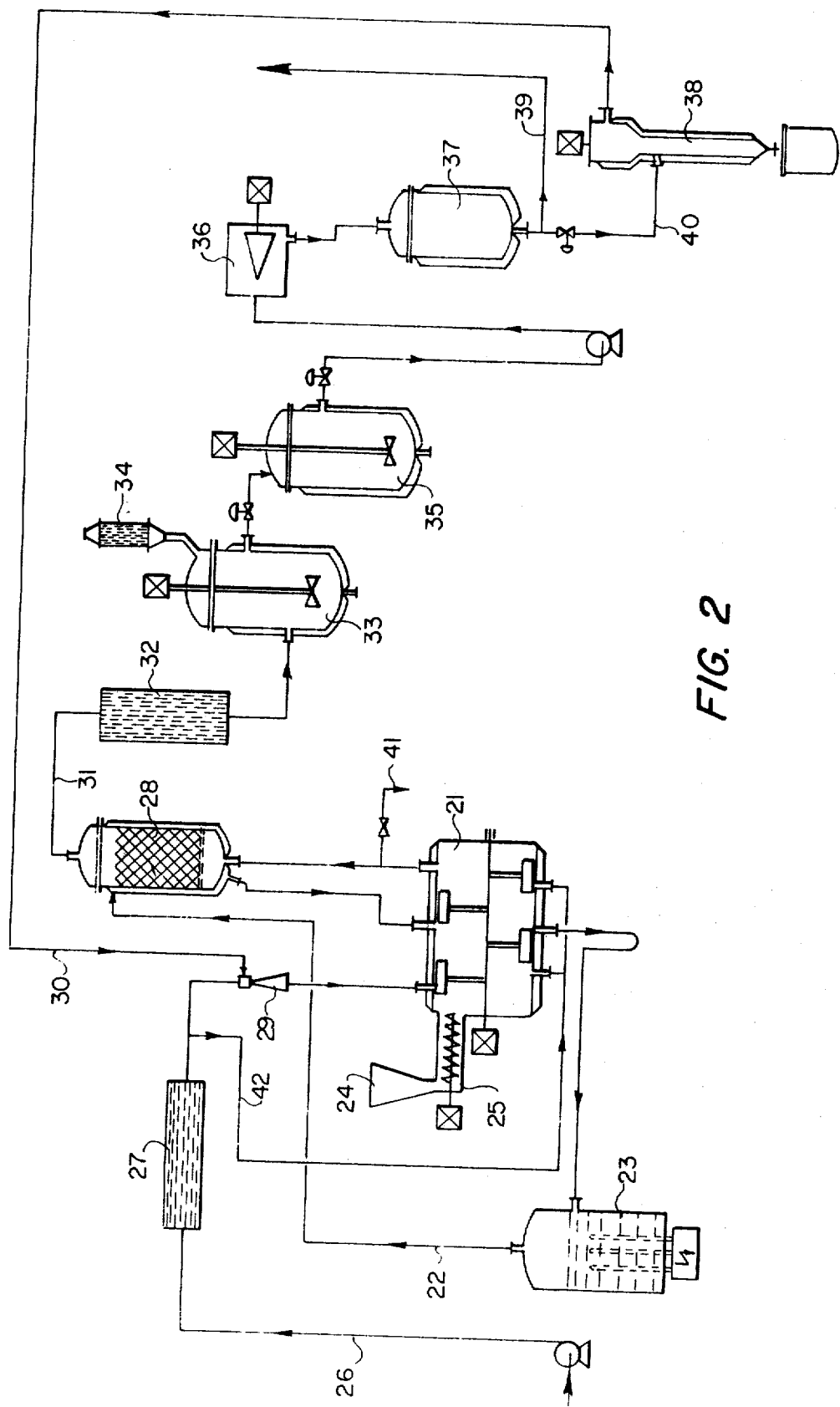

The invention will now be explained in further detail and in connection with the accompanying drawing, in which:

FIG. 1 diagrammatically represents a form of laboratory apparatus operable for use in carrying out the process of the invention, and FIG. 2 diagrammatically represents pilot plant apparatus for use in carrying out the same process.

EXAMPLE 1 (FIG. 1)

Apparatus: 250 ccm of steel balls with a diameter of 4 mm are placed inside a rotary glass furnace 7 of 300 mm length and 130 mm diameter (= 2.1 liters volume), which is equipped with a paddle system 8. The furnace is heated by an electric jacket heating. Two successfully arranged esterification reactors 9 and 11, each possessing a volume of 2 liters, are charged with bead-shaped silica gel bodies of 4 to 6 mm diameter, with the catalyst bed — beginning immediately at the rotary furnace exit — being placed on a screen of 3 mm mesh size. The first (main) reactor 9 is heated by a cluster of electric heating rods 10 which are distributed uniformly over the space of the reactor. No heating elements are installed in the well-insulated secondary reactor 11. Thermometers are arranged in the rotary furnace, the rotary furnace exit, the main reactor and the secondary reactor for temperature control.

Terephthalic acid is introduced continuously from a 3-liter bunker 5 by means of a screw conveyor 6 at the front end of the rotary furnace. Methanol is forced by a reciprocating pump 2 from a tank 1 into a vaporizer 3 and thence into a superheater 4 where it is superheated to 300° C. Parallel thereto, liquid terephthalic acid dimethyl ester (at 170° C.) is pumped from a heated and stirred vessel 16 by means of a reciprocating feed pump 19 into a vaporizer system 18, vaporized there and superheated at 300° C. The two flows of products are conducted jointly through an electrically heated tube furnace 4, heated to 330° C. and are then immediately introduced into rotary furnace 7.

The reaction products emerging from the secondary reactor 11 in the gaseous state are cooled in a condenser 12 to approximately 170° C., and the terephthalic acid dimethyl ester condenses during this operation. The vapor-liquid mixture is then condensed and cooled, whereby the terephthalic acid dimethyl ester will crystallize out in receiver 13, and the liberated heat is removed by the evaporating methanol. The methanol is condensed dephlegmatorically in a cooler 14 and is returned to the receiver 13 for the terephthalic acid dimethyl ester. There, a recrystallization, and thus a purification, of the ester accumulated from the synthesis, will take place under these conditions. A waste gas dial 15 is installed downstream of the methanol cooler 14 to control the exhaust gas. The suspension of methanol and terephthalic acid dimethyl ester which accumulates in the terephthalic-acid-dimethyl-ester receiver is continuously removed by means of a bottom drain valve (as indicated). A vessel 17 contains nitrogen and protects the system against overpressure in the case of obstructions.

| At temperatures | rotating furnace (7) interior | 320 to 325°C. |
| | rotating furnace (7) exit | 310 to 320°C. |
| | fixed bed (9) | 325°C. |
| | secondary reactor (11) | 280 to 300°C. | there are introduced per hour (a) 600 g. of terephthalic acid with a terephthalaldehyde-content of 1.98%, (b) 700 g. of terephthalic acid dimethyl ester and (c) 1,800 g. of CH$_3$OH.

In the rotary furnace 7 there can be observed a very rapid vaporization of the reaction products, which means that under the conditions given fully vaporized reaction products enter the main reactor 9. The crude ester, accumulating in the terephthalic-acid-dimethyl-ester receiver 13, has an SZ < 1.

The batch of crude ester is water-clear and free of any mechanical impurity. The yield of terephthalic acid dimethyl ester, relaitve to the terephthalic acid employed, is almost quantitative. Within a running time of 6 hours and a throughput of 3.6 kg of terephthalic acid, 4.3 kg of terephthalic acid dimethyl ester and 10.8 kg of CH$_3$OH there were separated 7.9 kg of terephthalic acid dimethyl ester. Of particular interest is the observed fact that upon conclusion of the test the catalyst bed of reactor 9 remained completely free of deposits and incrustations.

EXAMPLE 2 (FIG. 2)

The esterification which, in Example 1, was carried out at a laboratory scale, was further reduced to practice by the use of an industrial pilot plant apparatus in the following manner (here referring to FIG. 2):

43 kg of powdered terephthalic acid are introduced per hour by a double-flight screw conveyor 25 from a bunker 24 into a horizontal rotary furnace 21 of approximately 600 liters volume, which furnace is equipped with a paddle system and with a heating jacket which is heated to approximately 320° C. by heat-carrying steam via 22 from steam generator 23, and is charged with 240 liters of silica gel catalyst in bead form which material is very abrasion-resistant but only slightly active.

Parallel thereto, there is injected by means of a jet system 29 methanol 26 from methanol superheater 27 at a temperature of approximately 340° C. and at quantities of 129 kg. per hour. If desired, a partial stream of the superheated methanol can be introduced, as indicated by conduit 42, at the bottom of the rotary furnace. Inside the rotary furnace the median temperature is maintained at about 290° C.

In a successively arranged fixed bed of silica gel in double-walled vessel 28 charged with 700 liters of silica beads (= 460 kg.), the esterification reaction is concluded, with the required reaction heat being introduced into the jacket by condensing heat-carrying steam at 350° C.

The reaction mixture 31, emerging from the reactor 28 in the gaseous state, consists of terephthalic acid dimethyl ester, reaction-water and methanol. It is cooled in the successively arranged condenser 32 to 160° C. while generating low pressure stream, and enters a stirring vessel, such as suspension stirrer 33, filled with methanol. The boiling methanol condenses in a condenser 34 which is installed on top of the suspension stirrer 33, and is then returned into the stirrer. The suspension of dimethyl terephthalate in methanol (approximately 30 % of terephthalic acid dimethyl ester) so formed is cooled to approximately 10° C. in a second stirring vessel (brine stirrer 35), and separated in a centrifuge 36 into solid matter and mother-liquor. The material still damp with methanol thrown off by the centrifuge is placed into a melting tank 37 which is kept at a temperature between 170° to 190° C. The crude ester melt — with the characteristics: SZ = 1, Fp: 140° C. — is transported by way of pipe line 39 to a purifying still (not shown).

One portion of the crude ester from the melting tank 37 is conveyed (by line 40) to a film evaporator 38, evaporated there at a temperature of 290° C., and returned by way of a pipe line 30 into the superheated methanol flow 27 (jet 29).

Between the rotary furnace 21 and the fixed bed of silica gel 28 there is installed an outlet 41 which permits the removal of a specimen from the flow of reaction products emerging from the rotary furnace during the course of the esterification. By analysis of the reaction material it becomes possible to follow and check the course of the esterification within the rotary furnace (terephthalic acid conversion).

to 100 molar percent based on the amount of powdered terephthalic acid in said original dispersion, and immediately conducting the dispersion through a fixed bed of esterification catalyst in lump form.

2. The improved process according to claim 1, wherein the terephthalic acid and the terephthalic dimethyl ester within the methanol vapor are blasted within a vortex furnace.

3. The improved process according to claim 1, wherein a horizontal rotary tube is used as vortex furnace.

4. The improved process according to claim 3, wherein the horizontal rotary tube contains a paddle agitating system.

5. The improved process according to claim 3, wherein the horizontal rotary tube contains inert bodies.

6. The improved process according to claim 3, wherein the horizontal rotary tube contains catalyst pieces.

7. The improved process according to claim 1,

THE TEST RUN

The esterification is started without the feed-back of dimethyl terephthalate, and the following values were obtained on the basis of the reaction discharge from the rotary furnace (specimen removal from outlet (41)):

| Hours of operation | | 10 | 30 | 35 | 45 |
|---|---|---|---|---|---|
| $CH_3OH$ | kg/h | 129 | 129 | 129 | 129 |
| of above introduced at bottom | kg/h | 70 | 70 | — | — |
| Terephthalic acid | kg/h | 43 | 43 | 43 | 43 |
| Terephthalic acid dimethyl ester | kg/h | — | — | — | — |

Test after discharge from rotary furnace

| Hours of operations | | 10 | 30 | 35 | 45 |
|---|---|---|---|---|---|
| SZ | | 493 | 529 | 556 | 560 |
| terephthalic acid | % by weight | 68.0 | 75.7 | 84.1 | 85.2 |
| terephthalic acid monomethyl ester | % by weight | 17.9 | 10.9 | 11.5 | 9.0 |
| terephthalic acid dimethyl ester | % by weight | 14.1 | 13.4 | 4.4 | 5.3 |
| terephthalic acid — conversion | % by weight | 32.0 | 24.3 | 15.9 | 14.8 |
| terephthalic acid — conversion | kg | 13.7 | 10.4 | 6.8 | 6.4 |

In the case of the subsequent admixture of terephthalic acid dimethyl ester in the gaseous state (30) to the superheated methanol vapor flow (27) by jet system (29) the following values were measured:

| Hours of operations | | 55 | 65 | 80 |
|---|---|---|---|---|
| $CH_3OH$ | kg/h | 129 | 129 | 129 |
| of above introduced (via Sa) at bottom | kg/h | 70 | 70 | 70 |
| terephthalic acid | kg/h | 43 | 43 | 43 |
| terephthalic acid dimethyl ester | kg/h | 25 | 24 | 20 |

Test after discharge from rotary furnace

| | | 55 | 65 | 80 |
|---|---|---|---|---|
| SZ | | 166.5 | 169.5 | 201.0 |
| terephthalic acid | % by weight | 26.6 | 26.0 | 24.0 |
| | % by weight | No. (39.1) | No. (39.5) | No. (40.6) |
| terephthalic acid monomethyl ester | % by weight | 3.6 | 5.0 | 14.2 |
| | % by weight | No. ( 5.3) | No. ( 8.5) | No. (23.6) |
| terephthalic acid dimethyl ester | % by weight | 69.8 | 69.0 | 61.4 |
| | % by weight | No. (55.6) | No. (52.0) | No. (35.8) |
| terephthalic acid — conversion | % by weight | 60.9 | 60.5 | 59.4 |
| terephthalic acid — conversion | kg | 26.2 | 26.0 | 25.6 |

No. ( ) shows the value after deduction of the terephthalic-acid-dimethyl-ester feed-back

We claim:

1. Process for the continuous esterification of terephthalic acid with methanol to the production of terephthalic acid dimethyl ester, which comprises bringing together into an original dispersion, at a temperature of from 300° to 350° C., methanol vapor and powdered terephthalic acid and vaporized terephthalic acid dimethyl ester, the latter in an amount ranging from 50 wherein shaped silica gel bodies are used as catalyst.

8. The improved process according to claim 1, wherein the esterification catalyst consists in silica gel beads which had been subjected to the vapor of a lower alcohol for a period of 20 to 120 minutes and at rising temperatures, in the range from 100° to 350° C., and then had been allowed to cool off slowly.

* * * * *